April 21, 1942.    O. P. WAGNER ET AL    2,280,677
FORCED FEED CUTTER AND SPREADER FOR COMBINES
Filed Dec. 7, 1940    2 Sheets-Sheet 1
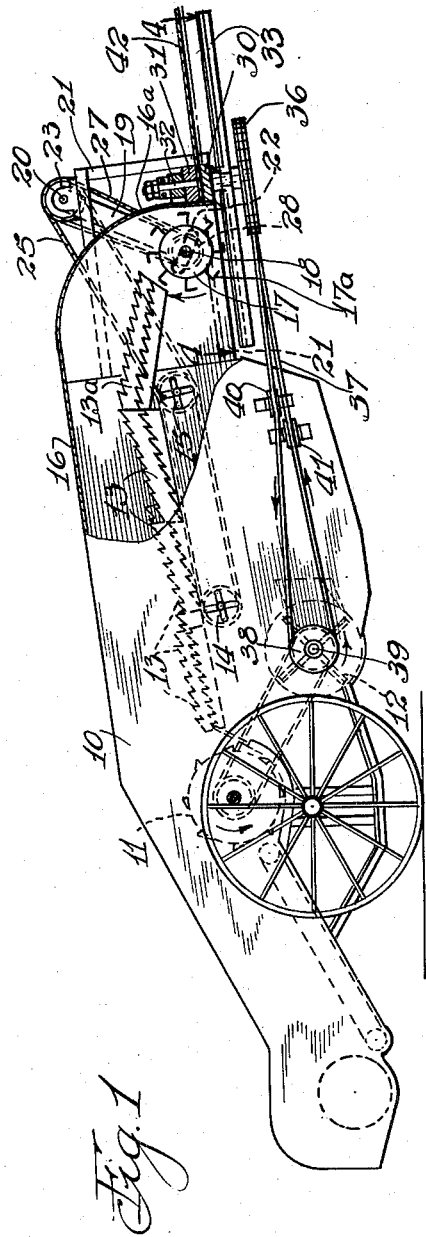
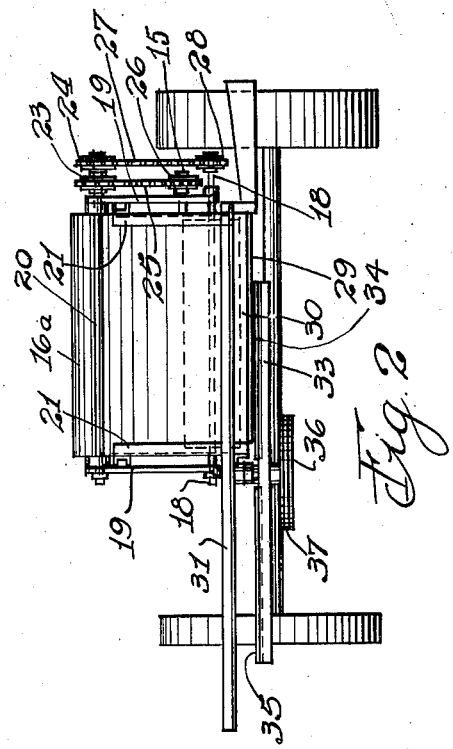
INVENTORS.
OSCAR E. WAGNER.
OMAR P. WAGNER.
BY Albert C. Bell
ATTORNEY.

April 21, 1942.   O. P. WAGNER ET AL   2,280,677
FORCED FEED CUTTER AND SPREADER FOR COMBINES
Filed Dec. 7, 1940   2 Sheets-Sheet 2
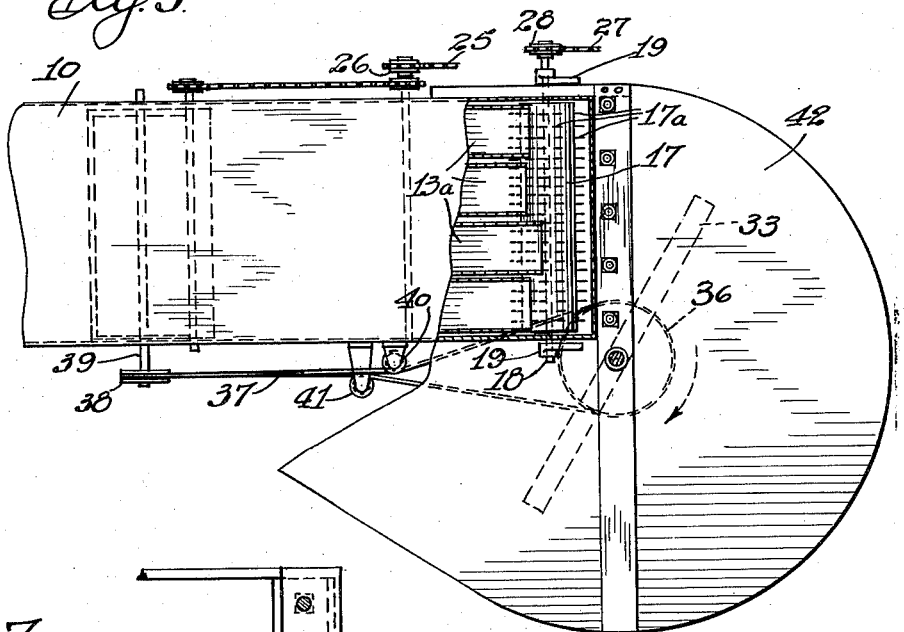
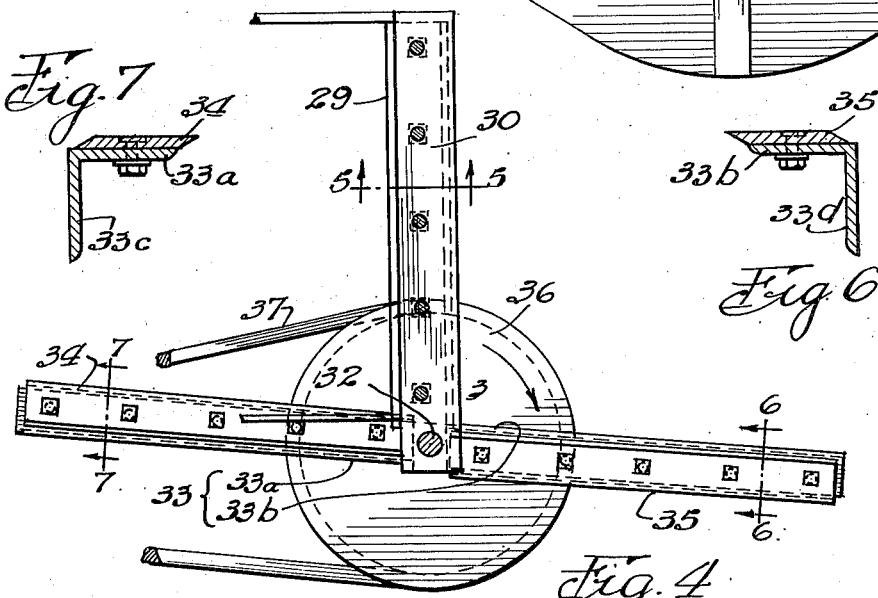
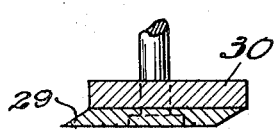
INVENTORS
OSCAR E. WAGNER
OMAR P. WAGNER
BY Albert C. Bell
ATTORNEY.

Patented Apr. 21, 1942

2,280,677

UNITED STATES PATENT OFFICE 2,280,677

FORCED FEED CUTTER AND SPREADER FOR COMBINES

Omar P. Wagner and Oscar E. Wagner, Eppards Point Township, Livingston County, Ill.

Application December 7, 1940, Serial No. 369,078

20 Claims. (Cl. 146—111)

Our invention consists of cutting and spreading mechanism for use with and constituting a part of a harvester combine, by which the straw, vines or stalks delivered by the combine, depending upon the crop being harvested, are cut into short lengths and spread or scattered over the ground from which the crop has been harvested. In the past it has been the practice for a combine to deliver the straw, vines and stalks in the same length that they were harvested, to fertilize the soil by their decay, and it has been found that the length of the straw, vines and stalks has frequently made subsequent plowing and cultivating difficult, particularly where conditions are such that the decay of the straw, vines or stalks has proceeded to but a small extent before the plowing or cultivating, and where the straw, vines and stalks are tough or are not of a nature to be readily broken up by the plowing or cultivating, such as vines of soy beans and corn stalks. By our invention, which is effective with any crops that can be harvested by combines, the straw, vines and stalks delivered from the straw racks of the combine, are at once positively engaged by the feeding devices of our invention, and forced thereby at any desired rate of feed to and through the cutting mechanism, by which the straw, vines and stalks are cut into short pieces of any desired length, our invention also including spreading mechanism engaging the short pieces immediately after they are cut, by which the short pieces are thrown and scattered in different directions back of the combine and also laterally from the combine over the ground from which the crop has been harvested. In this manner, besides being distributed evenly over the ground, the short pieces of straw, vines and stalks do not in any way interfere with plowing or cultivating, they are not gathered thereby into masses or bunches, and they are thereby thoroughly mixed in uniformly distributed condition with the soil, which not only establishing a condition most favorable to their rotting, but also insures the uniformly distributed fertilization of the soil by the products of their disintegration.

Our invention is also applicable to cases where on occasion it is desired to windrow the straw, vines or stalks delivered by the combine, instead of spreading them in short pieces on the ground. In such cases, the cutting and spreading mechanism is disconnected and inperative as long as the windrowing is to continue, but the positive feeding mechanism remains in operation and produces the windrow with a degree of uniformity corresponding to the uniformity of the crop being harvested. The windrows are then raked in the usual manner, for removal as desired.

In addition to greatly facilitating the cultivation of the soil and improving its fertilization, our invention provides a further advantage in connection with crop pests which thrive in long and uncut vines and stalks, for example, corn borers, which are known to find corn stalks in long lengths a favorable place for propagation and development. With the stalks cut into short pieces as described by the use of our invention, the development and multiplication of the borers is greatly interfered with and the control of the pest is correspondingly facilitated.

The devices of our invention are positively driven by the engine constituting a part of the combine to drive its cylinder, straw racks, fan and other operating parts, which insures the proper coordination of the operation of our feeding, cutting and spreading devices with the operation of the combine.

Our invention will be best understood by reference to the accompanying drawings illustrating a preferred embodiment thereof, in which Fig. 1 shows our invention in side elevation as a part of a combine, of which a part of the side wall is broken away to more clearly show the working parts, Fig. 2 is a rear end elevation of the structure shown in Fig. 1, Fig. 3 is a plan view of the structure with a part of the top wall of the combine removed, Fig. 4 is a horizontal, sectional view to an enlarged scale, of a part of the structure, taken along the line 4—4 in Fig. 1, and shows the cutting mechanism, and Figs. 5, 6 and 7 are vertical, sectional views, to a further enlarged scale, of parts of the structure shown in Fig. 4, taken respectively along lines 5—5, 6—6 and 7—7 in Fig. 4.

Similar numerals refer to similar parts throughout the several views.

In Fig. 1, we illustrate the rear portion of a combine 10, having a cylinder 11, a fan 12 and straw racks 13 operated by crank shafts 14 and 15, all arranged and driven by the combine engine in a manner well known in combine construction. The other parts of the combine are not shown as they are not included in and do not form a part of the present invention. By our invention the rear portion of the top wall 16 of the casing of the combine is curved downwardly at 16a to form a wall for directing the straw, vines or stalks delivered by the straw racks 13, to the cutting mechanism. Just in front of the lower portion of the wall 16a, we dispose a horizontal feeding roll 17 extending across the machine parallel with the lower part of the wall 16a, and having projecting lugs or teeth 17a to engage the straw, vines or stalks and positively feed the same. The roll 17 is mounted on a horizontal cross-shaft 18, the ends of which are supported in suitable bearings carried by the lower ends of the parallel swinging arms, 19, 19, supported at their upper ends on a second cross-shaft 20 to which said arms are preferably rigidly secured. The cross-shaft 20 is supported at its ends in suitable bearings carried by the side frames 21, and in a position substantially above the roll 17 and somewhat to the rear of the bottom part of the wall 16a when the roll 17 is in its rearmost position. The side walls of the combine have arcuate clearance slots 22 through them in line with the shaft 18 which extends through said slots, to permit swinging movement of the roll 17 away from the wall 16a to accommodate different thicknesses of straw, vines or stalks fed by the roll. It will be noted that the location of the roll 17 relatively to the shaft 20 always results in the exertion of a pressure on the straw, vines or stalks being fed, which is directed towards the guide wall 16a, said pressure being substantially proportional to the thickness of the material being fed, which increases the effectiveness of engagement of the roll 17 with the material being fed, as the thickness of said material is increased.

The shaft 20 supports on one of its end portions, two sprocket wheels 23 and 24, (Fig. 2), which are secured together and which are rotary on said shaft. The wheel 23 is connected by a sprocket chain 25 with a sprocket wheel 26 secured to the crank shaft 15, (Fig. 2), and wheel 24 is connected by a sprocket chain 27 with a sprocket wheel 28 secured to the shaft 18. In this manner, the roll 17 is positively driven for any of its positions, by the combine engine (not shown), and in a direction to feed the straw, vines or stalks downwardly on the inner surface of the wall 16a.

The material fed by the roll 17 is delivered therefrom immediately in front of the cutting edge of a horizontally disposed stationary knife 29, supported transversely of the machine by a horizontal bar 30 secured to the frames 21, 21. The knife 29 is located just below the path of the lugs or teeth 17a on the roll 17, and the knife 29 and cross bar 30 are back of, and substantially parallel with, and of substantially the length of the roll 17. Above the crossbar 30, the frames 21, 21 have secured to them and support a second horizontal crossbar 31, which is substantially twice as long as the crossbar 30, the crossbar 31 being so disposed that substantially half of its length projects beyond the combine housing.

Adjacent the end of the knife 29, and preferably opposite to the sickle side of the combine, the bar 31 supports for rotation, in a suitable bearing, a vertical spindle 32, preferably provided at its upper end with a thrust bearing and retaining nuts or the equivalent, preventing downward movement of the spindle and supporting the parts secured to and carried by the spindle. If desired, the spindle 32 may be mounted adjacent the sickle side of the combine, in which event its direction of rotation will be the reverse of that illustrated. Below its bearing, the spindle 32 has rigidly secured thereto a horizontal cutter bar 33, (Fig. 4) having equal and oppositely disposed arms 33a and 33b, said arms being so positioned that when the spindle 32 is rotated, said arms will successively pass under the knife 29. The arms 33a and 33b have upper horizontal surfaces and carry thereon similar cutting knives 34 and 35 adjusted so their cutting edges will successively engage the cutting edge on the knife 29, said knives 34 and 35 each being of a length to engage substantially the entire cutting length of the knife 29, which cutting length is preferably substantially equal to the length of the roll 17. The cutter bar 33 is preferably adjustable vertically to effect proper cutting engagement of the knives, by adjustment of the nuts or equivalent supporting devices on the upper end of the spindle 32. As shown in Figs. 6 and 7, the arms 33a and 33b are provided with downwardly extending longitudinal flanges 33c and 33d respectively on their trailing edges, which besides stiffening said arms, serve as vanes or blades for engaging the short cut pieces of straw, vines or stalks immediately that they are cut by the knives, to throw and scatter said short pieces back of the combine and also laterally therefrom over the harvested ground in a manner to uniformly distribute the short pieces over the ground. It will be noted that by mounting the knife 29 so its cutting edge is towards the front of the combine, and by mounting the spindle 32 on the side of the combine towards the harvested ground, the direction of rotation of the rotary knives 34 and 35 is such that during each cutting engagement with the knife 29, the rotary knife and therefore the corresponding vane or blade, moves towards the rear of the combine and immediately thereafter towards the harvested ground, which accounts for the direction of distribution of the cut short pieces. The relation of the stationary knife 29 to its supporting bar 30 is clearly shown in Fig. 5.

As shown in Fig. 1, below the cutter bar 33, the spindle 32 has rigidly secured to it, a grooved driving pulley 36 which is connected by a belt 37 with a grooved pulley 38 secured to the shaft 39 supporting and driving the fan 12, said shaft 39 being driven by the combine engine, not shown. Guide sheaves 40 and 41 on the combine housing, serve to properly guide the belt 37.

It will be observed that the length of the short cut pieces of straw, vines or stalks, is determined by the relation of the speed of operation of the roll 17 to the speed of operation of the cutter bar 33; that is to say, the more rapid the feeding effected by the roll 17 for any uniform speed of the cutter bar 33, the longer the cut pieces will be, and vice versa. By our invention we are able, therefore, to cut the short pieces of any desired length. In a practical embodiment of our invention, we have found that driving the cutter bar at about half the speed of the fan shaft and driving the roll 17 at about half the speed of the crank shafts operating the straw racks, gives satisfactory results for general use. We do not, however, limit ourselves to such speed relations, as we may employ any speed of operation of either the roll 17 or the cutter bar 33, without departing from the scope of our invention.

Where it is desired to windrow the straw, vines or stalks in using our invention, this may be readily accomplished by removing the belt 37 and securing the cutter bar 33 against rotary movement, for example, in line with the knife 29, in which case the roll 17 will feed and deliver the material to the ground in uncut condition and we still have the advantage of the forced feed feature of our invention, which tends to produce uniform windrows, depending, of course, upon the uniformity of the crop being harvested.

In Fig. 1, we illustrate the last section 13a of the straw racks, in a position and relation different from the position found in combines heretofore, in that it is inclined downwardly from front to rear, to bring its discharge end closely adjacent the upper surface of the feed roll 17. This we find to be advantageous in that it not only brings the straw, vines or stalks directly into engagement with the feed roll 17 on its delivery from the straw racks, but it in addition tends to keep the material in separated condition and to prevent bunching thereof.

In Figs. 1, 2 and 3 we illustrate a guard plate 42 of substantial sheet metal, mounted in horizontal position just above the rotary cutter bar 33, and supported by the cross bars 30 and 31. This is an important part of the construction in that it not only prevents accidents that would result from contact with the cutter bar and its knives, but it also prevents cut pieces of the straw, vines or stalks from being thrown upwardly and in undesired directions.

The invention described is adapted for use on and in connection with combine harvesters of any construction, and it does not in any way interfere with the main purposes and operations of the combine with which it is used.

While we have shown our invention in the particular embodiment above described, we do not limit ourselves thereto, as we may employ equivalents thereof without departing from the scope of the appended claims.

What we claim is:

1. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, and cutting mechanism adjacent and below said feeding devices and moving across the path of the plant stems delivered therefrom, whereby the plant stems are cut into short pieces and in that condition are delivered from the combine to the ground.

2. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, and cutting mechanism adjacent below said feeding devices and moving across the path of the plant stems delivered therefrom, whereby the plant stems are cut into short pieces and in that condition are delivered from the combine to the ground, the length of said short pieces being determined by the relative speeds of operation of said feeding devices and said cutting mechanism.

3. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, cutting mechanism adjacent below said feeding devices and moving across the path of the plant stems delivered therefrom, whereby the plant stems are cut into short pieces and in that condition are delivered from the combine to the ground, and driven spreading members for engaging said short pieces and scattering them over the ground.

4. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, cutting mechanism adjacent below said feeding devices and moving across the path of the plant stems delivered therefrom, whereby the plant stems are cut into short pieces and in that condition are delivered from the combine to the ground, and driven spreading members for engaging said short pieces and scattering them over the ground, said spreading members having operative discharging movement towards the rear end of the combine, thereby projecting said short pieces rearwardly from the combine.

5. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, cutting mechanism adjacent below said feeding devices and moving across the path of the plant stems delivered therefrom, whereby the plant stems are cut into short pieces and in that condition are delivered from the combine to the ground, and driven spreading members for engaging said short pieces and scattering them over the ground, said feeding roller having yielding supports accommodating different thicknesses of plant stems between said roller and said directing wall.

6. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, cutting mechanism adjacent below said feeding devices and moving across the path of the plant stems delivered therefrom, whereby the plant stems are cut into short pieces and in that condition are delivered from the combine to the ground, and driven spreading members for engaging said short pieces and scattering them over the ground, said cutting mechanism and said spreading members having operative discharging movement in common towards the rear end of the combine and thereby cooperating to project said short pieces rearwardly from the combine.

7. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, cutting mechanism adjacent below said feeding devices and moving across the path of the plant stems delivered therefrom, whereby the plant stems are cut into short pieces and in that condition are delivered from the combine to the ground, and driven spreading members for engaging said short pieces and scattering them over the ground, said cutting mechanism and said spreading members having operative discharging movement in common towards the rear end of the combine and thereby cooperating to project said short pieces rearwardly from the combine said feeding roller having yielding supports accommodating different thicknesses of plant stems between said roller and said directing wall.

8. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, cutting mechanism adjacent below said feeding devices and moving across the path of the plant stems delivered therefrom, whereby the plant stems are cut into short pieces and in that condition are delivered from the combine to the ground, and separate driving connections for said feeding devices and for said cutting mechanism, the driving connections for said cutting mechanism having an operative condition producing said short pieces and having also an inoperative condition for which the plant stems are delivered by the feeding devices to the ground in uncut condition.

9. As a part of a harvester combine having straw delivery racks, feeding and cutting mechanism for plant stems such as straw, vines or stalks delivered from the straw racks of the combine, including in combination feeding devices positively engaging and forcibly feeding the plant stems delivered by the straw racks, said feeding devices including a downwardly curved directing wall and a feeding roller adjacent said wall for engaging said plant stems and moving them downwardly along said wall, cutting mechanism adjacent below said feeding devices and moving across the path of the plant stems delivered therefrom, whereby the plant stems are cut into short pieces and in that condition are delivered from the combine to the ground, and driven spreading members for engaging said short pieces and scattering them over the ground, said cutting mechanism and said spreading members being mounted for rotary movement in horizontal planes.

10. As a part of a harvester combine having side walls and a rear end wall, a rotary fan and shaft, straw racks in sections, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a movable knife rotary in a horizontal plane for cutting engagement with said stationary knife, a vertical spindle mounted for rotation at one end of said stationary knife and secured to said rotary knife, and second driving connections between said fan shaft and said spindle.

11. As a part of a harvester combine having side walls and a rear end wall, a rotary fan and shaft, straw racks in section, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a movable knife rotary in a horizontal plane for cutting engagement with said stationary knife, a vertical spindle mounted for rotation at one end of said stationary knife and secured to said rotary knife, and second driving connections between said fan shaft and said spindle, said feed roll having projecting lugs for positively engaging said plant stems.

12. As a part of a harvester combine having side walls and a rear end wall, a rotary fan and shaft, straw racks in sections, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a movable knife rotary in a horizontal plane for cutting engagement with said stationary knife, a vertical spindle mounted for rotation at one end of said stationary knife and secured to said rotary knife, and second driving connections between said fan shaft and said spindle, said second driving connections having operative and inoperative conditions for respectively cutting the plant stems into short pieces and for delivering the plant stems uncut for windrowing.

13. As a part of a harvester combine having side walls and a rear end wall, a rotary fan and shaft, straw racks in sections, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a movable knife rotary in a horizontal plane for cutting engagement with said stationary knife, a vertical spindle mounted for rotation at one end of said stationary knife and secured to said rotary knife, and second driving connections between said fan shaft and said spindle, said rotary knife having a depending flange along its trailing edge for spreading cut pieces of the plant stems.

14. As a part of a harvester combine having side walls and a rear end wall, a rotary fan and shaft, straw racks in sections, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a movable knife rotary in a horizontal plane for cutting engagement with said stationary knife, a vertical spindle mounted for rotation at one end of said stationary knife and secured to said rotary knife, and second driving connections between said fan shaft and said spindle, said end wall being curved and constituting a guide wall for the plant stems from the straw racks and during their engagement by the feed roll and directly the plant stems in front of said stationary knife.

15. As a part of a harvester combine having a sickle side and having side walls and a rear end wall, a rotary fan and shaft, straw racks in sections, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a movable knife rotary in a horizontal plane for cutting engagement with said stationary knife, a vertical spindle mounted for rotation at one end of said stationary knife and secured to said rotary knife, and second driving connections between said fan shaft and said spindle, said spindle being opposite the sickle side of the combine.

16. As a part of a harvester combine having a sickle side and having side walls and a rear end wall, a rotary fan and shaft, straw racks in sections, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a straight cutter bar substantially twice as long as said stationary knife, a vertical spindle mounted for rotation opposite the sickle side of the combine and adjacent the end of said stationary knife, said spindle having rigid connection with the mid-portion of said cutter bar to rotate the latter in a horizontal plane below and adjacent said stationary knife, a rotary knife on each end of said cutter bar for cutting engagement with said stationary knife, and second driving connections between said fan shaft and said spindle.

17. As a part of a harvester combine having side walls and a rear end wall, a rotary fan and shaft, straw racks in sections, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a straight cutter bar substantially twice as long as said stationary knife, a vertical spindle mounted for rotation opposite the sickle side of the combine and adjacent the end of said stationary knife, said spindle having rigid connection with the mid-portion of said cutter bar to rotate the latter in a horizontal plane below and adjacent said stationary knife, a rotary knife on each end of said cutter bar for cutting engagement with said stationary knife, and second driving connections between said fan shaft and said spindle, said cutter bar having a depending flange adjacent the trailing edge of each of said rotary knives and throughout its length for spreading cut pieces of the plant stems.

18. As a part of a harvester combine having side walls and a rear end wall, a rotary fan and shaft, straw racks in sections, and front and rear crank shafts for operating said straw racks, the combination of feeding and cutting mechanism for plant stems such as straw, vines or stalks delivered from the straw racks, including a horizontal feed roll between the lower portions of said side walls and parallel with and adjacent to said rear end wall, a first shaft supporting said feed roll for rotation and secured thereto and extending at its ends through said side walls, a second shaft parallel with said first shaft and supported a substantial distance above said first shaft and also to the rear thereof, parallel arms supported on and secured to the ends of said second shaft for swinging movement and having at their lower ends bearings supporting the ends of said first shaft for rotation, first driving connections between one of said crank shafts and said first shaft and including a pair of connected idler wheels rotary as a unit on said second shaft, said side walls having openings therethrough clearing said first shaft for swinging movement of said feed roll from and towards said rear end wall, a stationary and horizontal knife having its cutting edge below said feed roll and substantially in line with said rear end wall, a movable knife rotary in a horizontal plane for cutting engagement with said stationary knife, a vertical spindle mounted for rotation at one end of said stationary knife and secured to said rotary knife, and second driving connections between said fan shaft and said spindle, the rear section of said straw racks being inclined downwardly to the rear and terminating adjacent said feed roll.

19. As a part of a harvester combine having a sickle side and having side walls and a rear end wall, the combination of feeding and cutting mechanism for plant stems such as straw, vines or stalks delivered form the straw racks of the combine, including a horizontal feed roll between the lower portions of said side walls and parallel with and adjacent to said rear end wall, first driving connections for rotating said feed roll in a direction moving the plant stems downwardly between said feed roll and said end wall, a stationary and horizontal knife having its cutting edge below said feed roll and substantially in line with said rear end wall, a movable knife rotary in a horizontal plane for cutting engagement with said stationary knife, a vertical spindle secured to said rotary knife and mounted for rotation opposite the sickle side of the combine and adjacent the end of said stationary knife, and second driving connections for rotating said spindle, said rotary knife having a depending flange along its trailing edge for spreading cut pieces of the plant stems.

20. As a part of a harvester combine having a sickle side and having side walls and a rear end wall, the combination of feeding and cutting mechanism for plant stems such as straw, vines or stalks delivered from the straw racks of the combine, including a horizontal feed roll between the lower portions of said side walls and parallel with and adjacent to said rear end wall, first driving connections for rotating said feed roll in a direction moving the plant stems downwardly between said feed roll and said end wall, a stationary and horizontal knife having its cutting edge below said feed roll and substantially in line with said rear end wall, a straight cutter bar substantially twice as long as said stationary knife, a vertical spindle mounted for rotation opposite the sickle side of the combine and adjacent the end of said stationary knife, said spindle having rigid connection with the mid-portion of said cutter bar to rotate the latter in a horizontal plane below and adjacent said stationary knife, a rotary knife on each end of said cutter bar for cutting engagement with said stationary knife, and second driving connections for rotating said spindle, said cutter bar having a depending flange adjacent the trailing edge of each of said rotary knives and throughout its length for spreading cut pieces of the plant stems.

OMAR P. WAGNER.
OSCAR E. WAGNER.

CERTIFICATE OF CORRECTION.

Patent No. 2,280,677. April 21, 1942.

OMAR P. WAGNER, ET AL.

It is hereby certified that error appears in the printed specification of the above numbered patent requiring correction as follows: Page 3, first column, line 64, and second column, lines 9, 28, 50 and 72, and page 4, first column, lines 21, 47 and 71, claims 2 to 9 inclusive, after "adjacent" insert --and--; page 5, second column, line 39, claim 14, for "directly" read --directing--; page 6, first column, line 43, claim 17, after "combine" insert --having a sickle side and--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.